United States Patent [15] 3,703,137
Anderson et al. [45] Nov. 21, 1972

[54] HIGH-SPEED PRINTING APPARATUS

[72] Inventors: Lawrence K. Anderson, Stirling; Martin Feldman, Springfield; Douglas Arthur Pinnow, Berkeley Heights, all of N.J.

[73] Assignee: Bell Telephone Laboratories, Incorporated, Murray Hill, N.J.

[22] Filed: March 19, 1971

[21] Appl. No.: 125,948

[52] U.S. Cl. ..................................95/4.5 R, 350/150
[51] Int. Cl. ...........................B41b 17/00, B41b 17/08
[58] Field of Search ...........95/4.5; 350/150; 346/107

[56] References Cited

UNITED STATES PATENTS

| | | | |
|---|---|---|---|
| 3,482,182 | 12/1969 | Kosanke et al. | 350/150 X |
| 3,530,780 | 9/1970 | Haynes | 95/4.5 R |
| 3,349,677 | 10/1967 | Young | 95/4.5 R |
| 3,182,574 | 5/1965 | Fleisher | 95/4.5 R |
| 3,220,013 | 11/1965 | Harris | 350/150 X |

*Primary Examiner*—Robert P. Greiner
*Attorney*—R. J. Guenther and Kenneth B. Hamlin

[57] ABSTRACT

A high-speed printer includes a prerecorded multicharacter font stored in holographic form. Selection of a stored character for projection onto a recording medium is accomplished by means of a conventional X-Y acousto-optic deflection system. To achieve justified lines and attractively composed words, the printer must have a variable character- and word-spacing capability. This capability is realized by combining an electro-optic light deflector with the acousto-optic system in such a way as to controllably vary the angle at which an incident light beam interrogates a selected holographic character. For each different interrogation angle, the selected character is projected to a slightly different location along a row of the recording medium. In this way there is provided a vernier adjustment of the positions of characters to be printed.

7 Claims, 1 Drawing Figure

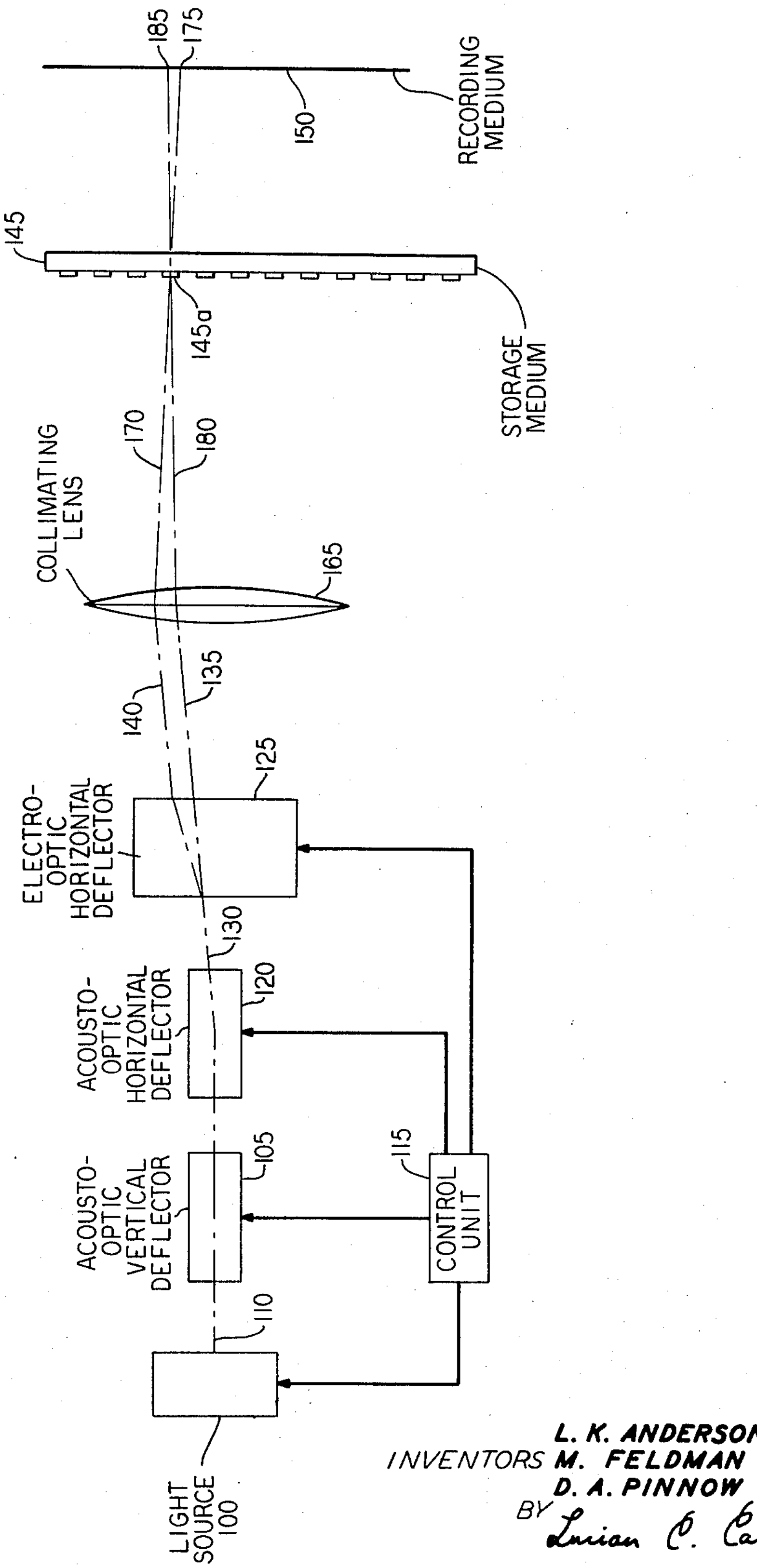
INVENTORS L. K. ANDERSON
M. FELDMAN
D. A. PINNOW
BY Lucian C. Canepa
ATTORNEY

HIGH-SPEED PRINTING APPARATUS

This invention relates to an arrangement for selectively deflecting a light beam and more particularly to such an arrangement, including cascaded deflectors, used as a high-speed printing apparatus.

BACKGROUND OF THE INVENTION

One known technique employed in the field of high-speed printing involves selecting characters to be printed from a prerecorded font. The selection process may, for example, include deflecting an optical beam to the known location of a prerecorded character and projecting an image of the selected character onto a suitable recording medium.

It is known that holograms are well suited for storing the prerecorded font required in such a printing system. By deflecting a coherent light beam to a specified location on a hologram, a particular stored representation is selected for readout.

A hologram is characterized by the ability to project a real image of its contents without the use of intervening optical components. Accordingly, no lenses are required to image a selected holographic representation onto the recording medium included in a printing system. This is of significant practical value since it simplifies the construction and alignment of the system.

One advantageous way of formatting the characters stored in a hologram which is to be used in a printing system is to include only one character, repeated many times, in each row of the holographic medium. In such a format, each row would contain as many representations as there are character positions per row on the recording medium. Thus, the letter A, for example, can be imaged onto any specified position in a row on a stationary recording medium simply by deflecting an incident light beam to the correspondingly-positioned area of a row of A's stored in the hologram. Once an entire row has been printed, the recording medium is mechanically translated, by an amount equal to the distance between adjacent rows, thereby to prepare the system for the printing of another row of characters.

In a practical printing system, a font of perhaps 128 different characters and 128 different character positions per line may be required. Moreover, to achieve justified lines and attractively-composed words, the system must in addition have a variable character- and word-spacing capability. This additional capability leads to a requirement that the horizontal or character-positioning deflector of the system be able to direct an incident light beam to any one of about 500 different positions.

One straightforward way of attempting to satisfy the above-specified requirement is to try to construct a system that includes a 500-position deflector utilized to access a linear array of 500 holographic representations. This approach, however, requires a rather formidable deflector and also, as a practical matter, introduces significant problems with respect to establishing adequate resolution and registration between the required hologram and its associated recording medium.

SUMMARY OF THE INVENTION

An object of the present invention is an improved apparatus for selectively deflecting a light beam.

More specifically, an object of this invention is a printing apparatus of the light beam deflection type which is characterized by high-speed, reliability, simplicity and a minimal number of mechanically moving parts.

Another object of the present invention is a high-speed printing apparatus in which light beam deflectors are utilized to access a prerecorded font and to achieve readout therefrom of characters to be printed.

Still another object of this invention is to embody a convenient vernier adjustment capability in the deflectors whereby each selected character in the prerecorded font can be projected to any specified one of several different positions on a recording medium.

These and other objects of the present invention are realized in a specific illustrative embodiment thereof that comprises a holographic storage medium. In accordance with the invention, this medium includes only as many separate holograms per row (for example, 128) as there are clearly resolved main character positions on an associated recording medium. A vernier adjustment of the location on the recording medium at which a selected holographic representation is projected is achieved by varying the angle at which an incident light beam interrogates the selected holographic representation. It is characteristic of a holographic storage member that for each one of several different interrogation angles a particular representation is projected onto a respectively different location along a row of the recording medium.

The vernier positional displacement is achieved by positioning a digital electro-optic light deflector immediately following a conventional X–Y acousto-optic deflection system. Assume, for example, that cascaded vertical and horizontal acousto-optic deflectors are arranged to deflect an incident light beam to any selected one of 16,384 (128 by 128) target areas arranged in a matrix of rows and columns. An auxiliary 4-position digital light deflector following the acousto-optic units provides interpolation by directing each different one of the beams incident thereon to a selected one of four parallel output paths. In turn, a single lens is effective simultaneously to convert the angular deflection of the acousto-optic deflectors into a change in beam position and the positional displacement of the digital light deflector into a change of interrogating angle with respect to the selected hologram.

It is a feature of the present invention that a several-position digital light deflector be combined with conventional acousto-optic units to enable an incident light beam to interrogate a selected holographic character from any one of several different angles. In this way there is achieved a vernier positional adjustment of the projection of the selected character onto an associated recording medium.

Accordingly, another feature of this invention is that the number of holographic characters per row of the storage medium be less than the total number of possible character reconstruction locations on the recording medium.

BRIEF DESCRIPTION OF THE DRAWING

A complete understanding of the invention and of the above and other objects, features and advantages thereof may be gained from a consideration of the following detailed description of an illustrative embodiment thereof presented hereinbelow in connection with the accompanying single FIGURE drawing which depicts a top view of a high-speed apparatus made in accordance with the principles of the present invention.

DETAILED DESCRIPTION

The apparatus shown in the drawing includes a light source 100 which illustratively comprises a laser whose output is a collimated light beam with a circular cross section, which is typical of a laser operating in the $TEM_{00}$ transverse mode. Other types of sources such as, for example, expanded or contracted laser beams, higher-order laser beams, collimated and/or filtered arc discharges or other light sources also may be employed to provide a light beam to be deflected by the depicted apparatus.

For some applications of practical interest, it is advantageous that the source 100 comprise, for example, a helium-neon laser operated in a conventional pulsed mode. For illustrative purposes, such a source will be assumed herein. In the pulsed mode of operation, the output of the source 100 comprises a sequence of narrow spaced-apart optical pulses each of which is propagated from the source 100 to a deflector 105 along a reference axis 110. The repetition rate and framing of such a sequence of pulses are determined in a straightforward way by applying electrical signals to the source 100 from a conventional control unit 115.

Illustratively, the unit 105 comprises a conventional acousto-optic deflector. The basic phenomenon underlying the mode of operation of such a deflector is that of Bragg diffraction, which is described, for example, by E. I. Gordon in *The Proceedings of the IEEE*, October 1966, pages 1391–1401.

In an acousto-optic deflector, ultrasonic waves are launched into a transparent medium (such as, for example, water, alpha iodic acid or lead molybdate) by electrically activating a transducer (made, for example, of lithium niobate) by means of a variable-frequency generator. (In the drawing the control unit 115 supplies such variable-frequency electrical signals to the deflector 105.) Accompanying the launched wave is a periodic modulation of the index of refraction of the transparent medium, which results from the alternate compression and rarefaction of the medium by the ultrasonic wave. The net result, in effect, is the production in the medium of a three-dimensional diffraction grating.

An incident light beam supplied by the source 100 is directed at and through the transparent medium included in the acuosto-optic deflector 105. In passing through the medium the beam interacts with any ultrasonic grating established in the medium. In particular, a portion of the beam incident on the grating at or near a certain special angle called the Bragg angle is scattered through an angle that depends on the grating spacing (that is, on the ultrasonic wavelength). In fact, for the small scattering angles (of the order of 1°) normally encountered in practice, this deflection angle is nearly proportional to frequency. Thus, by changing the ultrasonic frequency in steps, one can obtain a sequence of discrete beam deflections.

Thus, by means of the unit 105 shown in the drawing, it is possible to direct an incident light beam to any one of a plurality of target areas disposed along a vertical straight line which passes through the axis 110 and is perpendicular to the plane of the drawing. (Hence, the unit 105 will be referred to hereinafter as a vertical deflector.) Furthermore, it is known to cascade two such deflectors (one rotated 90° with respect to the other) to form a conventional X–Y deflection arrangement. Such an arrangement, comprising the vertical deflector 105 and an associated horizontal deflector 120 also of the acousto-optic type, is depicted in simplified schematic form in the drawing. In the interest of not obscuring the basic arrangement intended to be portrayed by the drawing, no focusing lenses, aperture-limiting devices or other conventional optical elements, whose nature and function are well known in the art, have been shown therein. Similarly, undeflected light which passes through the deflectors 105 and 120 without interacting therewith has been omitted from the drawing.

As specified above, the vertical deflector 105 is capable, under the control of applied electrical signals from the unit 115, of directing an incident light beam to any one of plural target areas disposed along a straight line perpendicular to the plane of the drawing. These areas are assumed to fall within the entry or left-hand face of the horizontal deflector 120. In turn, the unit 120 is adapted to deflect a beam directed at any specified one of these plural areas to plural target areas disposed along a straight line which is parallel to a line which lies in the plane of the drawing and is perpendicular to the main axis 110. As a result, the cascaded deflectors 105 and 120 are effective to deflect an incident light beam to any selected one of a multiplicity of target areas arranged in a matrix of rows and columns.

In accordance with the principles of the present invention, the matrix of target areas defined by the units 105 and 120 falls within the entry or left-hand face of an additional deflector unit 125. Illustratively, this additional unit is a conventional electro-optic deflector of the type described, for example, in "Digital Light Deflection," by T. J. Nelson, *The Bell System Technical Journal*, May 1964, pages 821–845. In response to electrical signals applied thereto from the control unit 115, the electro-optic deflector 125 is capable of further deflecting an incident light beam.

As is well known in the art, the electro-optic deflector 125 may comprise one or more cascaded stages. (Hereinafter $n$ will designate the number of such stages.) For illustrative purposes and so as not to unduly complicate the drawing, a one-stage ($n$=1) electro-optic deflector will be assumed.

Each stage of the deflector 125 is effective to direct an incident light beam to a specified one of two parallel output paths. Thus, for example, as shown in the drawing, a light beam directed at the deflector 125 along the path 130 will either pass through the deflector and continue along the path 135 or be deflected within the unit 125 and as a result propagate along the output path 140. The selection of one or the other output path is determined by control signals applied to the deflector 125 from the unit 115.

Illustratively, each stage of the electro-optic deflector 125 comprises the combination of an optical modulator made, for example, of KDP, KTN, $LiTaO_3$ or $BaNaNb_5O_{15}$ followed by a uniaxial crystal of, for example, $CaCO_3$. It is well known that uniaxial crystals have the property of displacing light of one polarization, called the extraordinary ray, while the orthogonal polarization, the ordinary ray, obeys Snell's law. If the two rays are parallel upon entering the crystal, they will be parallel upon leaving but are not parallel inside the anisotropic medium.

Assume a uniaxial crystal oriented so that its optic axis lies in an $x$–$z$ plane somewhere between the $x$ and $z$ axes. If the electric field vector of a plane-polarized beam is in the $x$ direction, the beam will be displaced by an amount proportional to the thickness of the crystal. The exact dependence of the deflection on the crystal thickness and orientation can be calculated. If, on the other hand, the beam is polarized in the $y$ direction such that its electric field vector is normal to the optic axis, the beam will pass through the crystal in a straight line.

If in such an electro-optic deflector a modulator precedes the uniaxial crystal and is capable of rotating the plane of polarization from the $x$ direction to the $y$ direction, and inversely, under the influence of an applied electric signal, then it is apparent that it is possible to switch the light beam selectively from one output position to the other.

The light beam output of the electro-optic deflector 125 is intended to be directed at a storage medium 145. Advantageously, the medium 145 comprises a plate that has been selectively exposed to radiation and processed in a manner well known in the art to record permanently the interference patterns of coherent wavefronts. Such a plate comprises an array of holograms. Herein the specific illustrative embodiment depicted in the drawing will be assumed to include an array of holograms as the storage medium 145.

An advantage of using an array of holograms as the storage medium 145 is that alignment and registration problems in the depicted arrangement are thereby minimized. Moreover, the illumination of a selected holographic representation stored in the medium 145 results in the selected representation being projected and imaged onto an output plane without the necessity of using any intervening optical components. These advantageous attributes of ease of alignment and simplicity of construction are well known to workers in the holographic art.

In the particular illustrative medium 145 shown in the drawing, multiple individual holographic representations are stored in a spaced-apart fashion in ordered rows and columns. Advantageously, the number of holographic representations stored in each row of the medium 145 equals the number of main character positions per line on a recording medium 150. In the particular arrangement depicted in the drawing, it is assumed that the medium 150 (which, for example, is made of any suitable radiation-sensitive material) includes nine main character positions per line. Accordingly, the storage medium 145 includes nine distinct holographic representations in each row. Moreover, the representations stored in the medium 145 are advantageously formatted such that the nine indications stored in a given row are identical to each other and bear a one-to-one correspondence with the main character positions on the recording medium 150. Thus, interrogation and readout of a particular one of the stored holograms in a selected row will cause the character stored thereat to be projected and imaged to the vicinity of the corresponding character position on the medium 150.

The storage medium 145 comprises plural rows of holographic representations. Each row stores a different character of a specified full set of characters to be printed on the medium 150. Thus, by illuminating a particular one of the matrix array of holograms, a specified character of the set is projected to the vicinity of a selected one of the main character positions of the row of the medium 150 that is currently being printed. Once a complete line of characters has been printed on the recording medium 150 in the manner described above, the medium is translated by a predetermined amount. Any suitable means may be utilized to accomplish such movement of the medium 150. Printing of the next line then takes place, and so forth.

In accordance with the principles of the present invention each holographic representation stored in the medium 145 is interrogated by directing a light beam thereat along a specified one of plural incident paths. This is accomplished simply by interposing a conventional collimating lens 165 between the electro-optic deflector 125 and the storage medium 145. Such a lens is effective simultaneously to convert the angular deflection of the acousto-optic deflectors 105 and 120 into a change in beam position, thereby to select a particular hologram for readout, and to convert the positional displacement of the electro-optic deflector 125 into a change of interrogating angle with respect to the selected hologram. This latter conversion is significant because it is characteristic of a holographic storage member such as the medium 145 that for each one of several different interrogating angles the selected representation will be projected onto a respectively different location along a row of an output plane.

Thus, for example, as shown in the drawing, a light beam propagated along either one of the parallel paths 135 or 140 is directed by the lens 165 to impinge upon the holographic representation **145*a* included in the storage medium 145. It is apparent that the angle of interrogation with respect to the representation 145*a* depends on the routing imposed upon the beam by the electro-optic deflector 125**.

A light beam directed along the path 170 between the lens 165 and the storage medium 145 will cause the holographic representation 145a to be projected onto the recording medium 150 at an area centered about a point 175. On the other hand a light beam that is directed along the path 180 will cause the representation **145*a* to be printed on the medium 150 at an area centered about a point 185 which is slightly displaced from the point 175. Accordingly, a simple and flexible vernier adjustment is achieved of the location on the medium 150** at which a selected holographic representation is projected. In this way the depicted printing apparatus is provided with a variable character- and word-spacing capability.

To increase the number of different possible locations on the recording medium 150 at which a particular holographic representation can be projected, it is necessary merely to increase the number of stages included in the electro-optic deflector 125. By including an n-stage deflector in the aforedescribed arrangement, a particular selected holographic representation can be projected to any specified one of $2^n$ printing positions on the recording medium 150.

It is to be understood that the above-described arrangement is only illustrative of the application of the principles of the present invention. In accordance with those principles, numerous other arrangements suitable, for example, for display and optical memory applications as well as printing may be devised by those skilled in the art without departing from the scope and spirit of the invention. For example, although the particular embodiment depicted in the drawing shows acousto-optic and electro-optic deflectors, in that order, interposed between a light source and a storage medium, it is to be understood that the electro-optic deflector may precede the acousto-optic units. The choice with respect to positioning the deflectors will depend in any particular case on whether an acousto-optic or an electro-optic unit will accommodate the somewhat larger aperture required by the unit positioned more distant from the light source. As a practical matter, it will in fact almost always be easier to get the wider usable angular aperture in an electro-optic deflector.

Moreover, the component parts of the electro-optic deflector 125 need not be both positioned together on one side of the acousto-optic units 105 and 120. One of these parts, namely, the active polarization-switching member, may be positioned between the source 100 and the acousto-optic deflector 105. The other part, namely, the member that causes a physical separation of orthogonally-polarized states, may be positioned between the acousto-optic deflector 120 and the collimating lens 165. This alternative arrangement is possible with certain acousto-optic deflectors, such as those made of lead molybdate, which are not sensitive to the polarization state of incident radiation. The main advantage of this alternative arrangement is that it minimizes the power required to drive the electro-optic deflector.

In addition, it is noted that the particular arrangement shown in the drawing may easily be modified to embody therein the principles set forth in the copending application of L. K. Anderson and M. Feldman, Ser. No. 98,741, filed Dec. 16, 1970. In such a modified arrangement, plural areas of the storage medium 145 can be simultaneously illuminated.

What is claimed is:

1. A printing apparatus comprising
a radiation-sensitive recording medium,
means positioned in alignment with said recording medium for storing a plurality of representations which when respectively interrogated by an incident radiant beam will be individually projected and imaged onto said recording medium to appear as printed matter thereon,
a radiant beam source,
means for deflecting a beam provided by said source to impinge upon a selected one of the representations stored in said first-mentioned means whereby the selected representation is projected and imaged within an assigned region of said recording medium,
and means interposed between said first- and second-mentioned means and responsive to a beam deflected to a specified location by said second-mentioned means for selectively establishing a particular one of plural possible angles at which the deflected beam is to interrogate the selected representation whereby the particular location within said assigned region on said recording medium at which an interrogated representation is projected is determined by the angle established by said third-mentioned means.

2. A printing apparatus comprising
a light-sensitive recording medium having at least one designated row comprising a multiplicity of assigned areas to which character elements to be printed are to be respectively projected,
means positioned in alignment with said medium and having at least one row of stored character elements which when respectively interrogated by a light beam will be respectively projected to said assigned areas on said medium,
means for providing a light beam,
means interposed in the path of said beam for routing said beam to impinge upon and thereby interrogate at least a selected one of said stored elements whereby each selected element is projected within its corresponding assigned area on said recording medium,
and means also interposed in the path of said beam and responsive to control signals applied thereto for controllably establishing a particular one of plural possible angles at which each selected element is to be interrogated whereby the positional displacement of said selected element within its corresponding assigned area is thereby determined.

3. A high-speed printing apparatus comprising
means for supplying a light beam,
means interposed in the path of said beam for deflecting it to any specified one of a plurality of target areas disposed in a matrix of rows and columns,
means interposed in the path of said deflected beam for storing in a matrix of rows and columns holographic representations of characters to be printed,
and a light-sensitive recording medium associated with said storing means and responsive to illumination of a stored character for recording a representation thereof,
wherein the improvement comprises
an *n*-stage electro-optic digital deflector positioned between said deflecting means and said storing means for further deflecting an incident beam of any specified one of $2^n$ parallel paths emanating from said digital deflector, where *n* is any positive integer,
and means positioned between said digital light deflector and said storing means for directing an incident beam to the one of the representations in said storing means selected by said deflecting means for also converting each different positional displacement imposed by said n-stage deflector into a corresponding change in the angle at which the deflected beam interrogates the selected holographic representation, whereby each different angular interrogation of a particular holographic representation causes the reconstruction of said representation on the recording medium to fall at a different position.

4. Apparatus as in claim 3 wherein said deflecting means comprises orthogonally-positioned acousto-optic deflection units.

5. Apparatus as in claim 4 wherein said directing and converting means comprises a collimating lens.

6. In combination, first means for deflecting a radiant beam to any specified one of a plurality of target areas disposed in a matrix of rows and columns, and second means responsive to said beam being deflected to any one of said target areas for further deflecting said beam to any specified one of $2^n$ parallel paths emanating from said second means, where $n$ is any positive integer.

7. A combination as in claim 6 further including third means responsive to said beam being further deflected by said second means for directing said beam to an output target area specified by said first means and for converting each different parallel routing imposed by said second means into a corresponding change in the angle at which the further-deflected beam is directed at said output target area.

* * * * *